(No Model.)
O. B. SHALLENBERGER.
ARMATURE FOR DYNAMO ELECTRIC MACHINES.
No. 397,392. Patented Feb. 5, 1889.
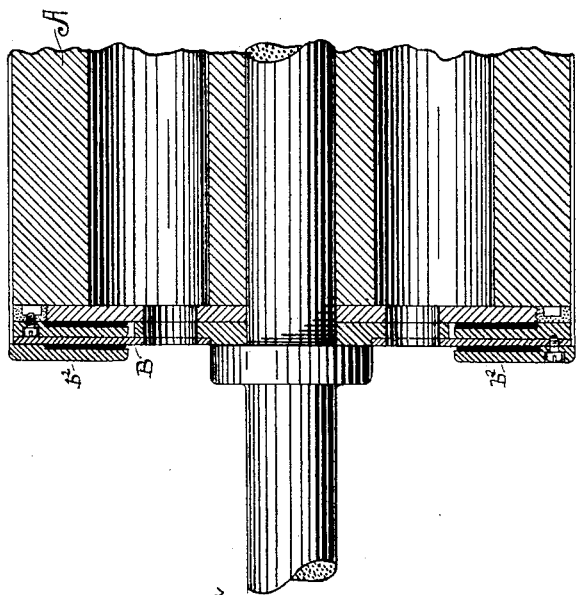
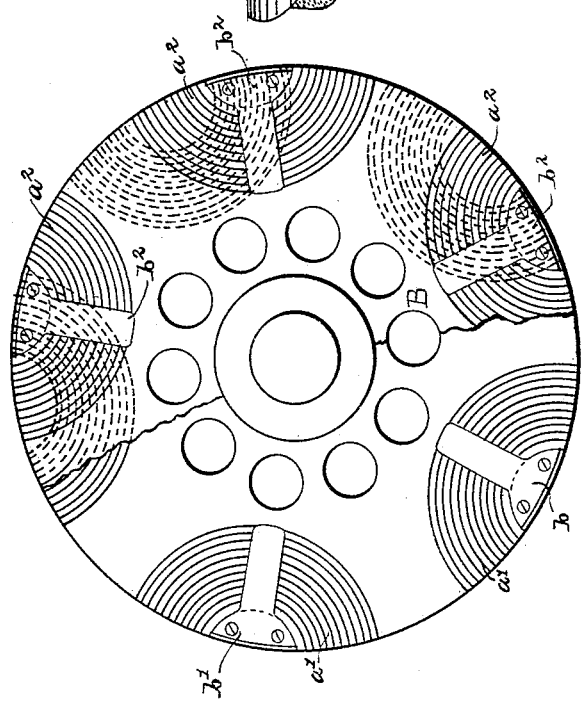
WITNESSES:
INVENTOR,
Oliver B. Shallenberger.
Pope, Edgcomb + Remy.
Att'ys.

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

ARMATURE FOR DYNAMO-ELECTRIC MACHINES.

SPECIFICATION forming part of Letters Patent No. 397,392, dated February 5, 1889.

Application filed October 11, 1888. Serial No. 287,845. (No model.)

*To all whom it may concern:*

Be it known that I, OLIVER B. SHALLENBERGER, a citizen of the United States, residing in Rochester, in the county of Beaver and State of Pennsylvania, have invented a certain new and useful Improvement in Armatures for Electric Machines, (Case No. 235,) of which the following is a specification.

The invention relates to the construction of armatures for electric machines.

The object of the invention is to provide a simple and convenient plan of winding two sets of coils upon an armature of the cylindrical type, so that each set of coils will occupy its proper position relatively to the other and at the same time shall be thoroughly insulated therefrom.

This invention is especially applicable to generators designed to deliver two alternating electric currents the phases of which are non-synchronous.

The invention will be described in detail in connection with the accompanying drawings, in which—

Figure 1 is an end view of the armature, partly in section, and Fig. 2 is a cross-section of one end of the armature.

Referring to the drawings, A represents the core of the armature. This may be made of laminated soft iron or in any other convenient manner. Upon this core there is wound a set of coils, $a'\ a'$, the wires of which lie along the surface of the cylinder and are carried down upon the ends beneath overhanging clips $b'\ b'$. These coils are located at equal distances around the circumference of the core and are designed to be connected with each other and with suitable commutators or collecting-rings, in a manner well understood. After the first set of coils has been applied, a plate, B, which may be of metal—such as brass—or, if desired, of insulating material, is secured to each end of the armature, covering the clips and the wire wound upon the ends. A second set of overhanging clips, $b^2\ b^2$, is secured to each end of the end plates, B, and the second set of coils $a^2$ is wound upon the face of the armature in the spaces left vacant by the first set and down the outer surfaces of the end plates beneath the overhanging clips $b^2$. The clips $b^2$ are so located with reference to the clips $b'$ as to bring the second set of coils $a^2$ in the proper position with reference to the coils $a'$ to secure the required difference of phase in the currents delivered by the two sets of coils. The plate B effectively separates the portions of the two sets of coils upon the ends of the armature.

I claim as my invention—

1. The combination of an armature-core, two sets of winding-clips for receiving the two sets of coils, one set of clips being secured to the body of the armature, and a plate at each end of the armature to which the other sets of winding-clips are secured.

2. In an armature for electric machines, a cylindrical core of soft iron, a set of armature-coils wound along the face and down upon the ends of the core, overhanging clips for retaining the coils in position secured to the ends of the armature, plates covering the clips and the wire upon the ends of the armature, a second set of armature-coils wound upon the face of the armature in the spaces left vacant by the first set, and down upon the outer surfaces of the respective insulating-plates, and winding-clips secured to the respective plates for retaining the second set of coils in position.

In testimony whereof I have hereunto subscribed my name this 2d day of October, A. D. 1888.

OLIVER B. SHALLENBERGER.

Witnesses:
 W. D. UPTEGRAFF,
 CHARLES A. TERRY.